United States Patent [19]

Oshima et al.

[11] Patent Number: 5,002,519

[45] Date of Patent: Mar. 26, 1991

[54] DUAL TENSION CLUTCH

[75] Inventors: Hiroshi Oshima; Hideo Okura; Hirofumi Sadakane, all of Osaka, Japan

[73] Assignee: Kubota Corporation, Osaka, Japan

[21] Appl. No.: 510,305

[22] Filed: Apr. 16, 1990

[30] Foreign Application Priority Data

Jul. 5, 1989 [JP] Japan ............................. 1-79748[U]

[51] Int. Cl.⁵ .............................................. F16H 7/08
[52] U.S. Cl. ..................................... 474/134; 474/135
[58] Field of Search ................... 474/101, 109–111, 474/113–117, 133–135; 74/845, 846; 192/138, 139

[56] References Cited

U.S. PATENT DOCUMENTS

| 976,115 | 11/1910 | Bard | 474/134 |
|---|---|---|---|
| 2,576,582 | 11/1951 | Elliott | 474/134 X |
| 2,945,393 | 7/1960 | Paulson | 74/845 |
| 3,598,194 | 8/1971 | Wappler | 474/134 X |
| 3,811,332 | 5/1974 | Brown et al. | 474/111 |
| 4,416,647 | 11/1983 | White, Jr. | 474/134 |
| 4,479,660 | 10/1984 | Pattison | 474/134 X |
| 4,511,348 | 4/1985 | Witdoek et al. | 474/134 X |

FOREIGN PATENT DOCUMENTS 62-31759 2/1987 Japan .

Primary Examiner—Thuy M. Bui
Attorney, Agent, or Firm—Jordan and Hamburg

[57] ABSTRACT

A dual tension clutch comprising a drive pulley, a driven pulley, and a transmission belt wound around the drive and driven pulleys. Opposite runs of the transmission belt are pressed inwardly by two spring-loaded tension pulleys supported by tension arms pivoted to each other. A triangular frame, as guided by a fixed pin, acts on the tension arms to spread the tension pulleys apart to relax the transmission belt. In the declutching state so established, the tension pulleys are opposed across and equidistant to a line extending through centers of the drive and driven pulleys.

5 Claims, 4 Drawing Sheets

DUAL TENSION CLUTCH

TECHNICAL FIELD

The present invention relates to a tension clutch structure for a belt transmission or the like in a working vehicle such as a walking operator type lawn mower or an agricultural tractor.

BACKGROUND OF THE INVENTION

A known walking operator type lawn mower has a belt transmission structure and a tension clutch structure as shown in FIG. 5. A transmission belt 12 is wound around a drive pulley 10 rotatable in opposite directions by an engine (not shown) and a driven pulley 11 connected to a rear wheel 2. A first tension pulley 13a and a second tension pulley 13b are arranged outside passages of right and left belt portions of the transmission belt 12. The first and second tension pulleys 13a and 13b are attached to a first tension arm 14a and a second tension arm 14b which are independently oscillatable on a transverse axis P1. A tension spring 15 extends between the first and second tension pulleys 13a and 13b.

The drive pulley 10 as shown in solid lines in FIG. 5 is standing still. When the drive pulley 10 is rotated counterclockwise as shown in FIG. 6, the righthand belt portion 12a is stretched under tension. Consequently, the first tension pulley 13a is pushed rightward, whereby the second tension pulley 13b is also drawn rightward. This results in the lefthand belt portion 12b being drawn inward. In this way, the entire transmission belt 12 is maintained in tension to be free from slips, and power is transmitted to the driven pulley 11.

A tension clutch structure for breaking the power transmission through this belt transmission structure will be described next. As shown in FIG. 6, a first auxiliary arm and a second auxiliary arm are attached to distal ends of the first and second tension arms 14a and 14b to act as oscillatable actuating members 16a and 16b. The first and second auxiliary arms 16a and 16b are interconnected at distal ends thereof by a pin. A rod 23 is connected to the pin also.

With this construction, when the rod 23 is pulled downward, the first and second tension pulleys 13a and 13b are spread sideways apart through the first and second auxiliary arms 16a and 16b. As a result, the transmission belt 12 is relaxed to produce a declutched state (as shown in two-dot-and-dash lines in FIG. 5).

According to the known construction described above, the first and second tension arms 14a and 14b and the first and second auxiliary arms 16a and 16b are freely oscillatable by the respective pin connections. Therefore, even when the first and second tension pulleys 13a and 13b are sideways spread apart to produce the declutched state, shakes or vibrations of the vehicle tend to cause sideways swings together of the first and second tension pulleys 13a and 13b as spread apart.

Such sideways swings would reinstate the tension pulleys 13a and 13b in tension, whereby the power is inadvertently transmitted from the drive pulley 10 to the driven pulley 11.

SUMMARY OF THE INVENTION

An object of the present invention is to provide an improvement in a tension clutch structure as shown in FIG. 5 for producing a declutched state reliably.

The above object is achieved, according to the present invention by a dual tension clutch comprising a drive pulley rotatable backward and forward, a driven pulley, a transmission belt wound around the drive pulley and driven pulley, a first tension pulley for inwardly pressing one run of the transmission belt, a second tension pulley for inwardly pressing an opposite run of the transmission belt, a first tension arm having one end connected to the first tension pulley and the other end pivotally supported, a second tension arm having one end connected to the second tension pulley and the other end pivotally supported, urging means for urging the first and second tension pulleys toward each other, and control means for moving the first and second tension pulleys between a clutching position and a declutching position, the control means including lock means for locking the first and second tension pulleys to positions opposed across and substantially equidistant to a line extending through centers of the drive pulley and driven pulley when the declutching position is established.

With the above construction, when the auxiliary arms corresponding to the auxiliary arms 16a and 16b shown in FIG. 5 move the first and second tension pulleys away from each other against the urging means, the lock means limits positions of the auxiliary arms and locks the tension pulleys to positions equidistant to the line extending through centers of the drive and driven pulleys.

The transmission belt is relaxed to provide a declutched state while the first and second tension pulleys are maintained in the positions equidistant to the line extending through the centers of the drive and driven pulleys. The tension pulleys remain immovable even when the drive pulley is rotated forward or backward to spread one of the belt runs outwardly, or when the machine shakes. Thus, the power of the drive pulley is not transmitted to the driven pulley in this state.

According to the present invention, therefore, a declutched state is produced reliably without inadvertently transmitting power to the driven side.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

An embodiment of the present invention will be described hereinafter with reference to the drawings showing to a walking operator type lawn mower which is one example of working vehicles.

Figure 1:
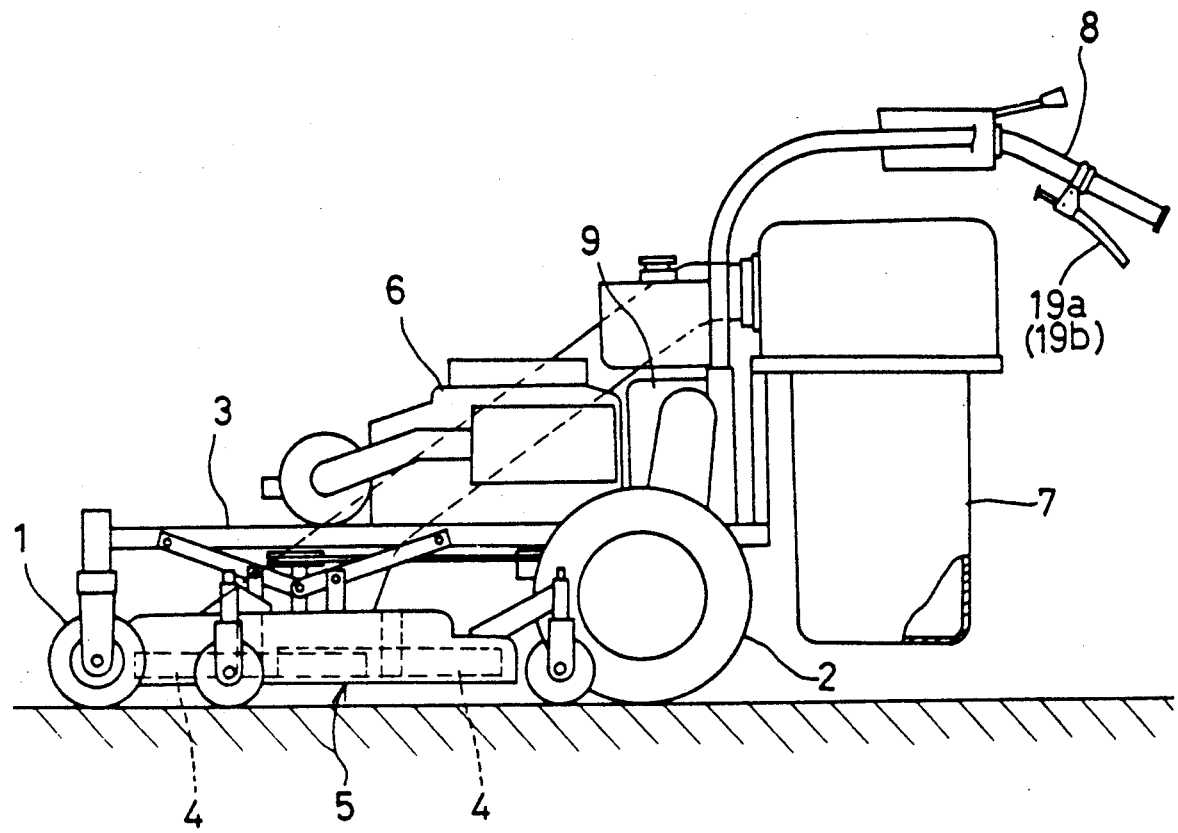
FIG. 1 is a side elevation of a walking operator type lawn mower equipped with a dual tension clutch according to the present invention.

Referring to FIG. 1, a self-propelled, walking operator type lawn mower comprises front wheels 1 and rear wheels 2 supporting a machine frame 3. A grass cutting unit 5 having three rotary blades 4 is mounted under the frame 3. The machine frame 3 further carries an engine 6 centrally thereof, and a grass catcher 7 and a steering handle 8 rearwardly.

Figure 2:
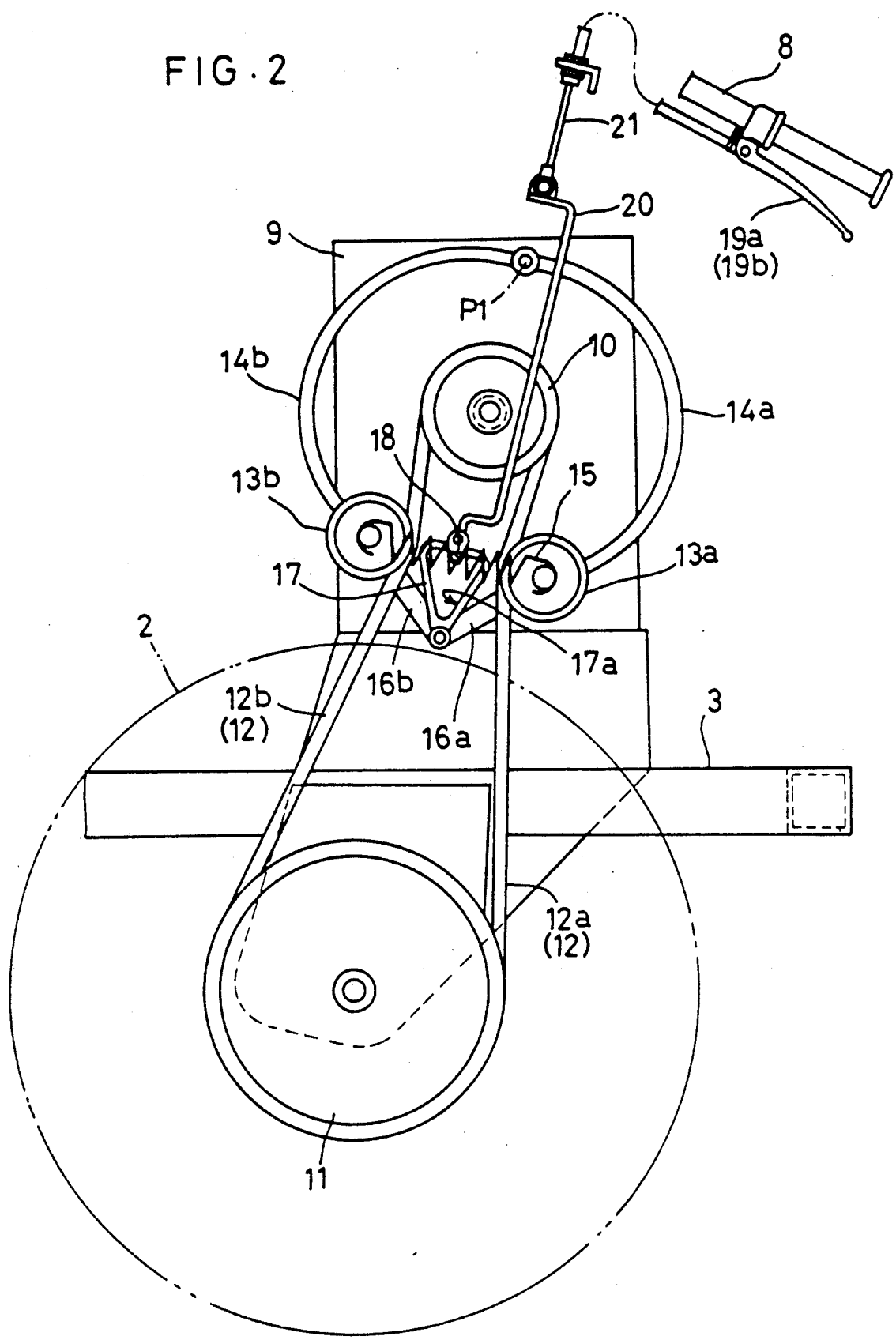
FIG. 2 is a side view of the dual tension clutch in an operative state.

A transmission structure for propelling the lawn mower will be described next. As shown in FIG. 1, the power of engine 6 is transmitted to a rear transmission case 9 through a belt transmission not shown. The transmission case 9 houses change speed gearing capable of backward-forward drive switching. As shown in FIG. 2, a drive pulley 10 is disposed on each side of the transmission case 9 for transmitting forward or backward drive to the right and left rear wheel 2.

As shown in FIG. 2, a transmission belt 12 is wound around the drive pulley 10 and a driven pulley 11 connected to the rear wheel 2. A first tension pulley 13a is disposed outside a passage of one belt portion of the transmission belt 12 between the drive pulley 10 and driven pulley 11. A second tension pulley 13b is disposed outside a passage of an opposite belt portion. The first and second tension pulleys 13a and 13b are attached to distal ends of a first tension arm 14a and a second tension arm 14b which are independently oscillatable on a transverse axis P1 of the transmission case 9. A tension spring 15 extends between the first and second tension pulleys 13a and 13b.

A first auxiliary arm and a second auxiliary arm are attached to distal ends of the first and second tension arms 14a and 14b to act as oscillatable actuating members 16a and 16b. The first and second auxiliary arms 16a and 16b are interconnected at distal ends thereof by a pin. To this pin is connected an oscillatable guide 17 defining a guide opening 17a of inverted triangle shape. A lock pin 18 fixed to the side of the transmission case 9 extends into the guide opening 17a. This lock pin 18 is located on a line extending through axes of the drive pulley 10 and driven pulley 11.

The above structure including the transmission belt 12 and the first and second tension pulleys 13a and 13b is provided for each of the right and left rear wheels 2. The guide 17 is connected through a link element 20 and a wire 21 to a grip type clutch lever 19a or 19b mounted on a right or left extension of the steering handle 8.

Figure 6:
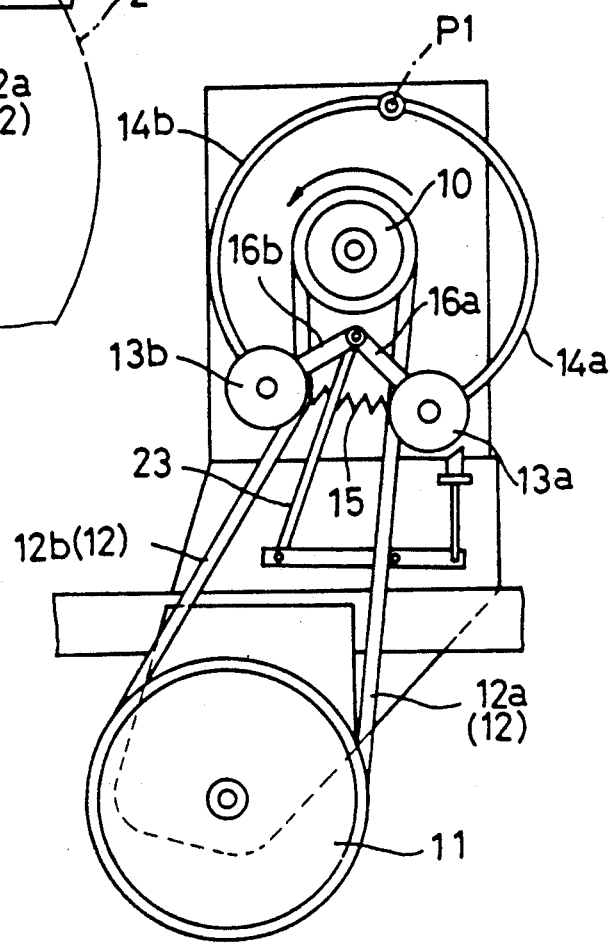

FIG. 2 shows a state of this structure produced when the operator has his or her hand off the clutch lever 19a or 19b. In this state, the lock pin 18 is located on the upper side of the guide opening 17a. This state allows the first and second tension arms 14a and 14b to oscillate freely with the first and second auxiliary arms 16a and 16b. When the drive pulley 10 is rotated forward or backward, the tension pulleys 13a and 13b move to one side and the power is transmitted to the driven pulley 11 as shown in FIG. 6.

Figure 3:
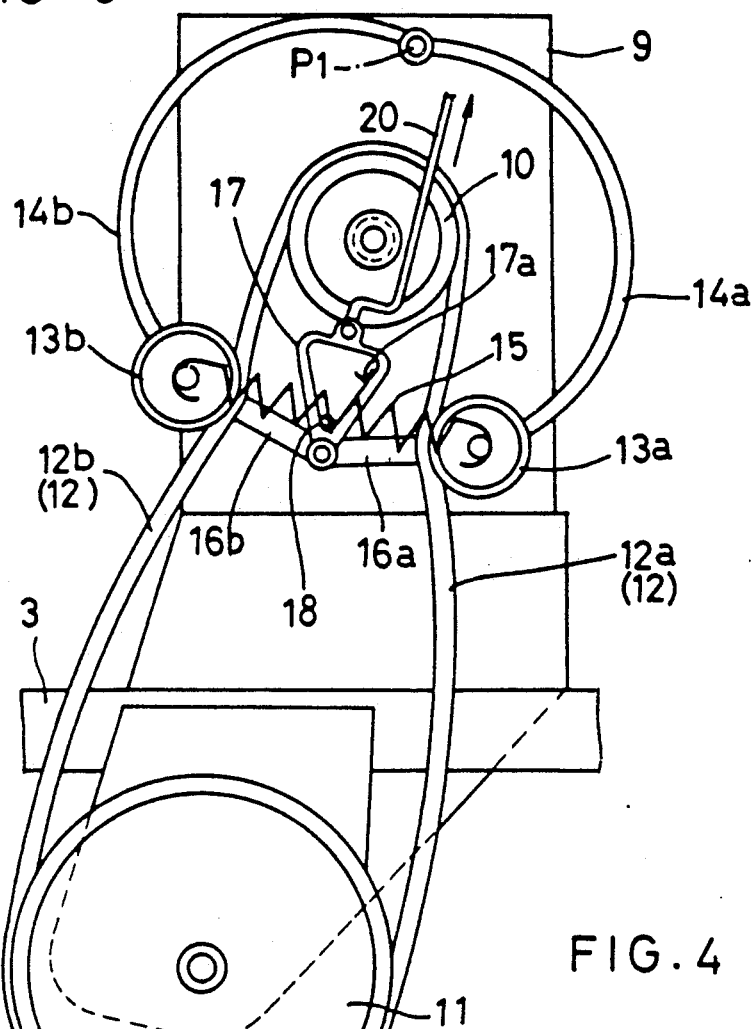
FIG. 3 is a side view of the dual tension clutch in a declutched state.

When the operator grips the clutch lever 19a or 19b, the wire 21 is pulled to lift the guide 17. Then, as shown in FIG. 3, the guide 17 is drawn by guiding action of the lock pin 18 to the line extending through the centers of the drive pulley 10 and driven pulley 11, while sideways spreading the first and second auxiliary arms 16a and 16b.

When the lock pin 18 reaches the bottom of the guide opening 17a, the guide 17 is locked to that position. Consequently, the first and second tension pulleys 13a and 13b are fixed to positions opposed across and equidistant to the line extending between the centers of the drive pulley 10 and driven pulley 11. In this state, the transmission belt 12 is relaxed to break the power transmission from the drive pulley 10.

The lawn mower is controlled to make a turn by gripping one of the right and left clutch levers 19a and 19b to break the power transmission to one of the right and left rear wheels 2 as described above.

Figure 4:
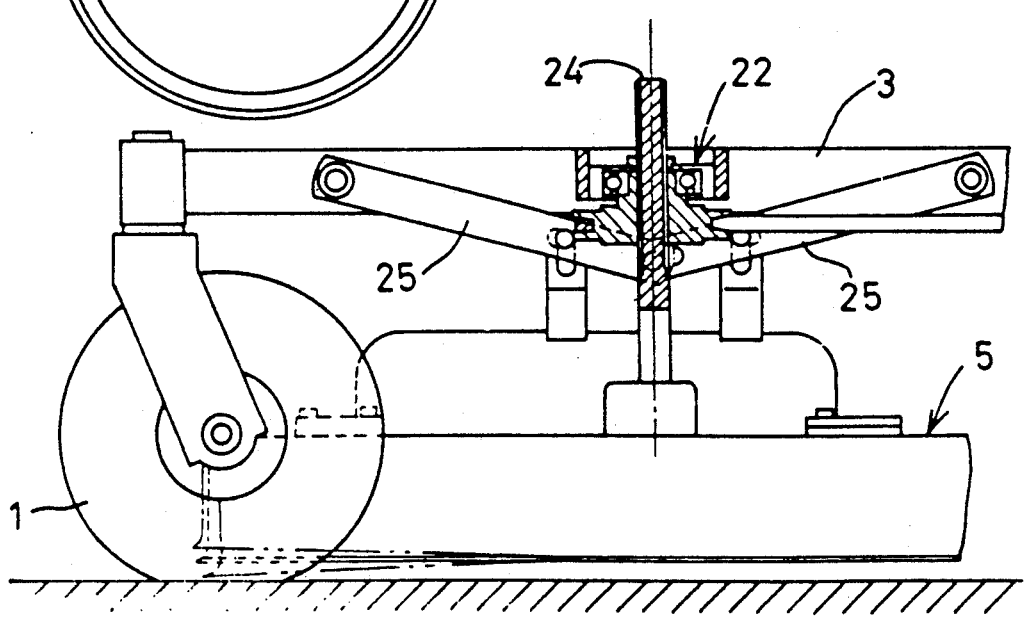
FIG. 4 is a view, partly broken away, of a cutter support structure of the lawn mower.
Figure 5:
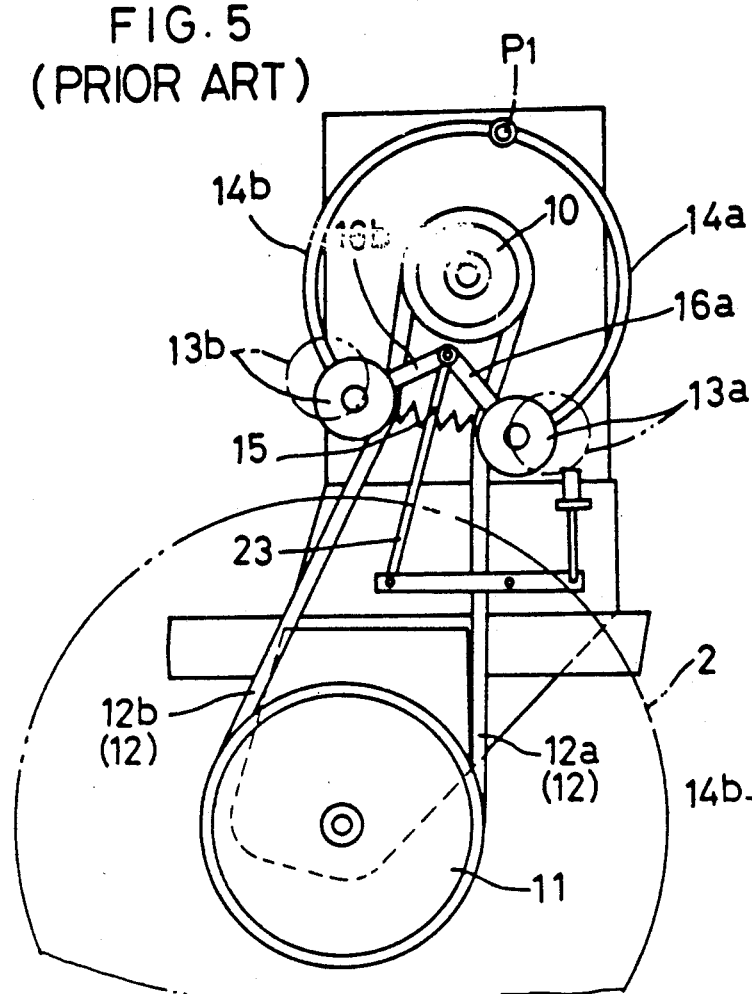
FIGS. 5 and 6 are side views of a conventional structure.

As shown in FIG. 4, the grass cutting unit 5 is driven by a power input shaft 24 connected to the machine frame 3 through a pillow block 22. The grass cutting unit 5 is supported by the machine frame 3 through links 25 to be tiltable within certain ranges longitudinally and transversely relative to the machine frame 3. This construction allows the grass cutting unit 5 to follow undulations of the ground with ease.

What is claimed is:
1. A dual tension clutch comprising;
    a drive pulley rotatable backward and forward,
    a driven pulley,
    a transmission belt wound around said drive pulley and said driven pulley,
    a first tension pulley for inwardly pressing one run of said transmission belt,
    a second tension pulley for inwardly pressing an opposite run of said transmission belt,
    a first tension arm having one end connected to said first tension pulley and the other end pivotally supported,
    a second tension arm having one end connected to said second tension pulley and the other end pivotally supported,
    urging means for urging said first tension pulley and said second tension pulley toward each other, and
    control means for moving said first tension pulley and said second tension pulley between a clutching position and a declutching position, said control means including lock means for locking said first tension pulley and said second tension pulley to positions opposed across and substantially equidistant to a line extending through centers of said drive pulley and said driven pulley when said declutching position is established.

2. A clutch as claimed in claim 1, wherein said control means further includes a first and a second auxiliary arms oscillatably interconnected by a common axis, with respective other ends pivotally connected to said first and second tension arms, said lock means being operable to lock said first and second auxiliary arms against movement.

3. A clutch as claimed in claim 2, wherein said lock means includes a guide plate defining an opening of inverted triangle shape with an apex pivotally connected to said common axis, and a guide pin extending into said opening and connected to clutch operating means through displacement transmitting means.

4. A transmission with a clutch for a self-propelling vehicle comprising;
    clutch operating means,
    a power transmitting mechanism including a drive pulley connected to an engine, a driven pulley connected to a ground wheel, and transmission belt means for transmitting power between said drive pulley and said driven pulley,
    dual tension pulley means including a first and a second tension pulleys for effecting clutching of said power transmitting mechanism, and
    control means for relaying a displacement from said clutch operating means to said dual tension pulley means, said control means including lock means for locking said first and second tension pulleys to positions opposed across and substantially equidistant to a line extending through centers of said drive pulley and said driven pulley when said tension pulley means is in a declutching position.

5. A transmission as claimed in claim 4, wherein said lock means includes a guide plate defining an opening of inverted triangle shape with an apex pivotally connected to an axis of said dual tension means, and a guide pin extending into said opening and connected to said clutch operating means.

* * * * *

UNITED STATES PATENT AND TRADEMARK OFFICE
CERTIFICATE OF CORRECTION

PATENT NO.   : 5,002,519

DATED        : March 26, 1991

INVENTOR(S)  : Oshima et al

It is certified that error appears in the above-identified patent and that said Letters Patent is hereby corrected as shown below:

The title page showing the illustrative Figure should be deleted to appear as per attached title page.

Signed and Sealed this

Third Day of November, 1992

Attest:

DOUGLAS B. COMER

*Attesting Officer*   Acting Commissioner of Patents and Trademarks

United States Patent [19]

Oshima et al.

[11] Patent Number: 5,002,519
[45] Date of Patent: Mar. 26, 1991

[54] DUAL TENSION CLUTCH

[75] Inventors: Hiroshi Oshima; Hideo Okura; Hirofumi Sadakane, all of Osaka, Japan

[73] Assignee: Kubota Corporation, Osaka, Japan

[21] Appl. No.: 510,305

[22] Filed: Apr. 16, 1990

[30] Foreign Application Priority Data

Jul. 5, 1989 [JP] Japan ................... 1-79748[U]

[51] Int. Cl.⁵ .................................... F16H 7/08
[52] U.S. Cl. ................................ 474/134; 474/135
[58] Field of Search .............. 474/101, 109-111, 474/113-117, 133-135; 74/845, 846; 192/138, 139

[56] References Cited

U.S. PATENT DOCUMENTS

| | | | |
|---|---|---|---|
| 976,115 | 11/1910 | Bard | 474/134 |
| 2,576,582 | 11/1951 | Elliott | 474/134 X |
| 2,945,393 | 7/1960 | Paulson | 74/845 |
| 3,598,194 | 8/1971 | Wappler | 474/134 X |
| 3,811,332 | 5/1974 | Brown et al. | 474/111 |
| 4,416,647 | 11/1983 | White, Jr. | 474/134 |
| 4,479,660 | 10/1984 | Pattison | 474/134 X |
| 4,511,348 | 4/1985 | Witdoek et al. | 474/134 X |

FOREIGN PATENT DOCUMENTS 62-31759  2/1987  Japan.

Primary Examiner—Thuy M. Bui
Attorney, Agent, or Firm—Jordan and Hamburg

[57] ABSTRACT

A dual tension clutch comprising a drive pulley, a driven pulley, and a transmission belt wound around the drive and driven pulleys. Opposite runs of the transmission belt are pressed inwardly by two spring-loaded tension pulleys supported by tension arms pivoted to each other. A triangular frame, as guided by a fixed pin, acts on the tension arms to spread the tension pulleys apart to relax the transmission belt. In the declutching state so established, the tension pulleys are opposed across and equidistant to a line extending through centers of the drive and driven pulleys.

5 Claims, 4 Drawing Sheets

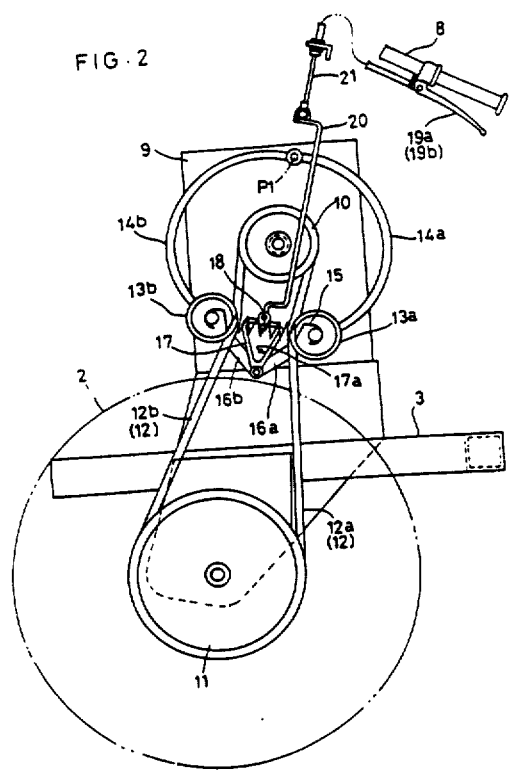

FIG. 2